(12) United States Patent
Degenkolb et al.

(10) Patent No.: US 9,499,020 B2
(45) Date of Patent: Nov. 22, 2016

(54) TWIST-LOCK TOW RECOVERY EYE

(71) Applicant: Ford Global Technologies, LLC, Dearborn, MI (US)

(72) Inventors: Jay R. Degenkolb, Rockwood, MI (US); James William Dunham, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/500,278

(22) Filed: Sep. 29, 2014

(65) Prior Publication Data

US 2016/0089941 A1   Mar. 31, 2016

(51) Int. Cl.
  *B60D 1/155*  (2006.01)
  *B60D 1/56*   (2006.01)

(52) U.S. Cl.
  CPC .................................... *B60D 1/565* (2013.01)

(58) Field of Classification Search
  CPC ........ B60D 1/155; B60D 1/167; B62B 1/008
  USPC ....................................................... 280/416
  See application file for complete search history.

(56) References Cited

U.S. PATENT DOCUMENTS

| | | | |
|---|---|---|---|
| 3,367,000 A * | 2/1968 | Schluter ..................... 24/573.11 |
| 3,453,925 A * | 7/1969 | Peterson ............... B28B 7/0014 411/346 |
| 3,503,626 A * | 3/1970 | Lowry et al. ............. 280/491.5 |
| 3,595,125 A * | 7/1971 | Jacobs ......................... 410/106 |
| 3,717,362 A | 2/1973 | Johnson |
| 4,630,982 A * | 12/1986 | Fenner .......................... 410/102 |
| 5,716,066 A * | 2/1998 | Chou et al. .................... 280/501 |
| 6,017,071 A * | 1/2000 | Morghen ........................ 294/94 |
| 6,065,766 A * | 5/2000 | Pulliam ...................... 280/415.1 |
| 6,189,910 B1 | 2/2001 | Bartel |
| 6,193,261 B1 * | 2/2001 | Hahka .......................... 280/515 |
| 6,338,649 B1 * | 1/2002 | Smith .................. H01R 11/287 411/552 |
| 6,695,338 B1 * | 2/2004 | Roberts ...................... 280/491.5 |
| 6,827,531 B2 * | 12/2004 | Womack et al. ............. 410/104 |
| 7,472,919 B2 | 1/2009 | Pratt et al. |
| 2009/0184493 A1 | 7/2009 | Eifert et al. |
| 2013/0307248 A1 * | 11/2013 | McCoy .......................... 280/495 |
| 2014/0291964 A1 * | 10/2014 | Sandberg ............... B60D 1/247 280/504 |

FOREIGN PATENT DOCUMENTS

FR   2697471 A1   5/1994

OTHER PUBLICATIONS

"Roadmaster Tow Bar Base Plate—EZ Saturn L-Series 03-05", http://www.rvcampchamp.com/03-05-SATURN-L-SERIES-Tow-Bar-Baseplate-p/523114-1.htm, 3 pages.

* cited by examiner

*Primary Examiner* — Kevin Hurley
*Assistant Examiner* — Marlon A Arce
(74) *Attorney, Agent, or Firm* — Jason C. Rogers; Bejin Bieneman PLC

(57) ABSTRACT

A vehicle tow recovery eye includes a shaft between a towing end connectable to a towable item and an insertion end that is insertable in a vehicle opening, a resistance assembly mounted on the shaft; and a locking pin having an axis that is substantially perpendicular to an axis of the shaft. The tow recovery eye can be used with a portion of a vehicle frame that includes a frame opening dimensioned to accommodate insertion of the shaft and the locking pin.

18 Claims, 5 Drawing Sheets

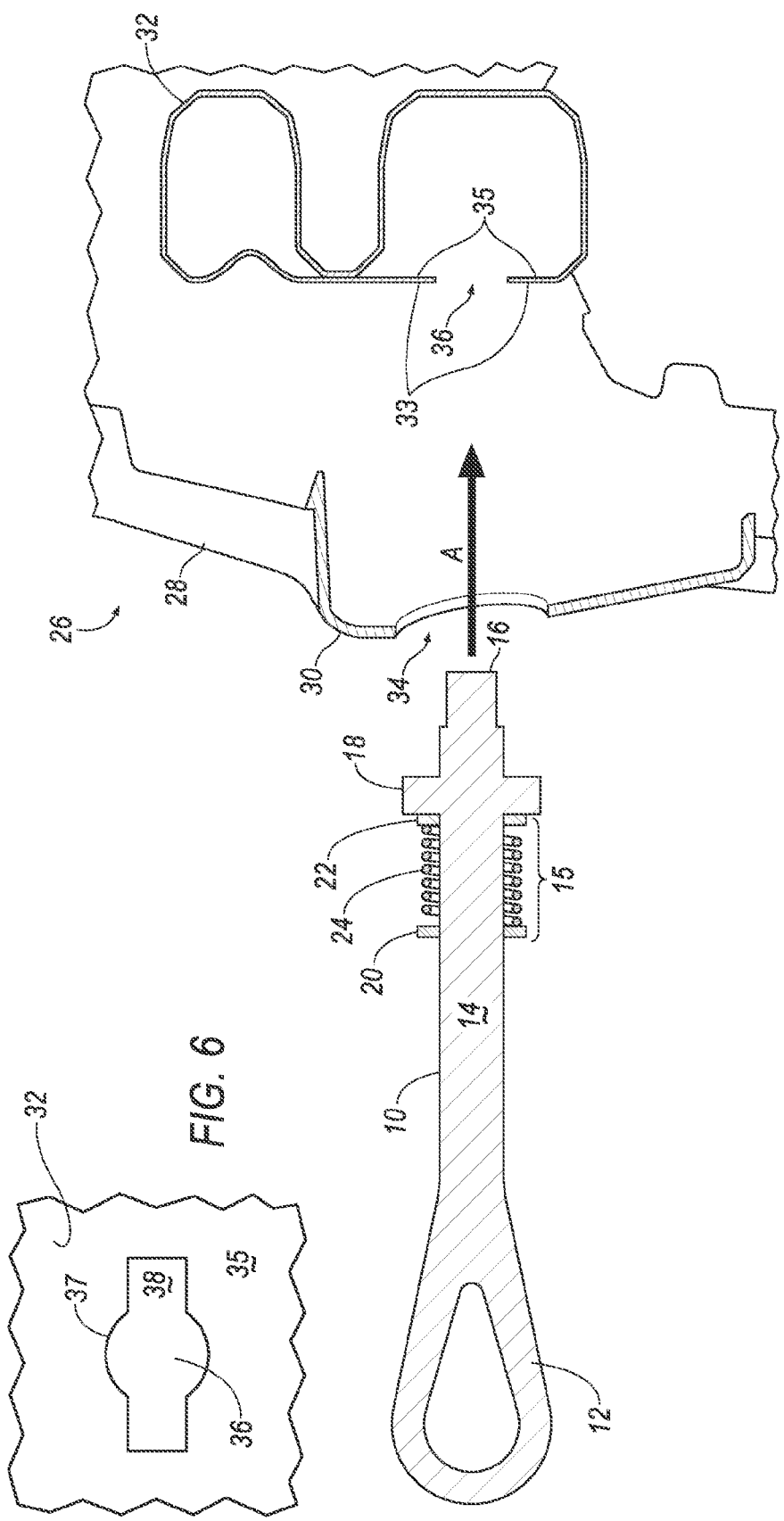

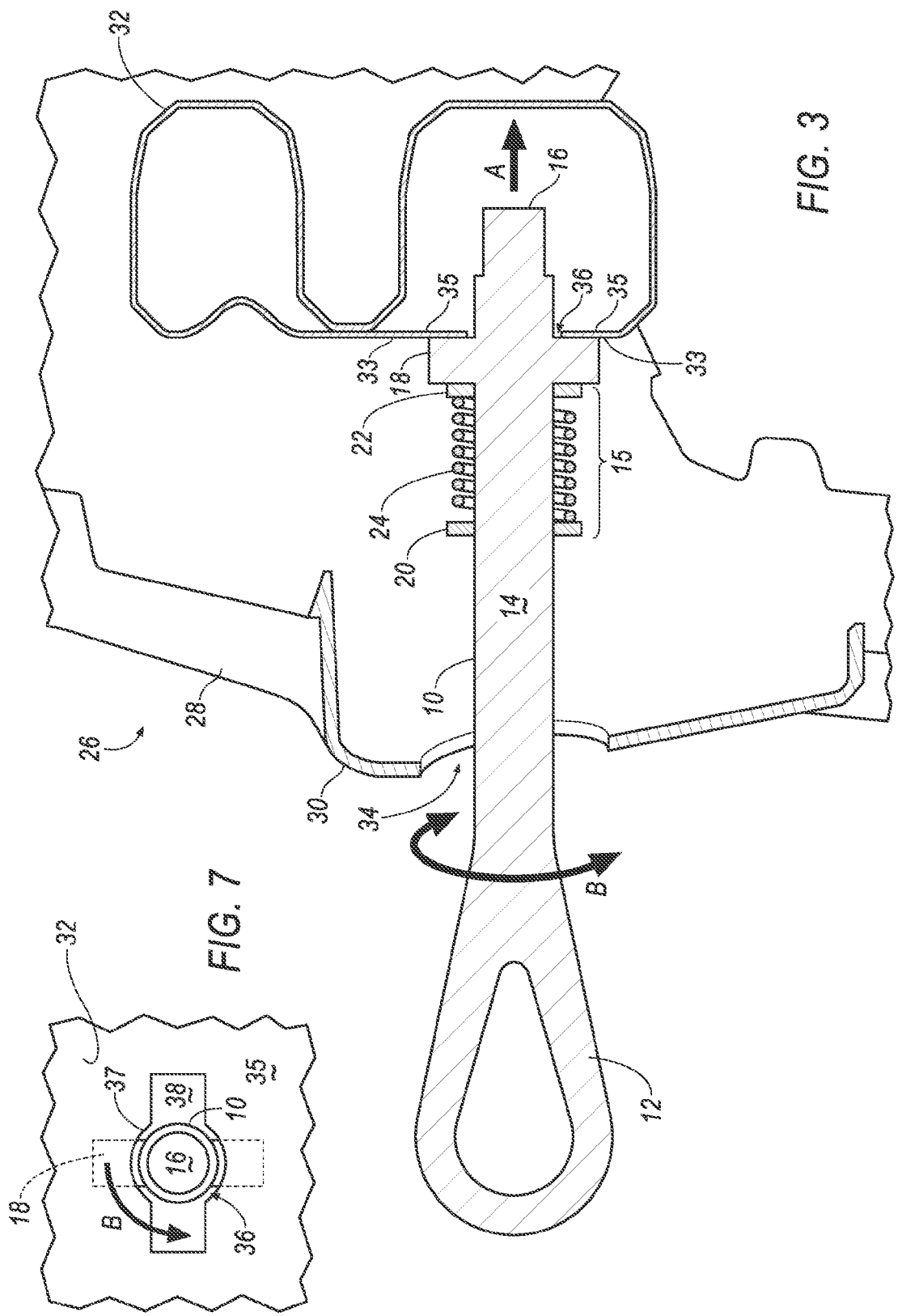

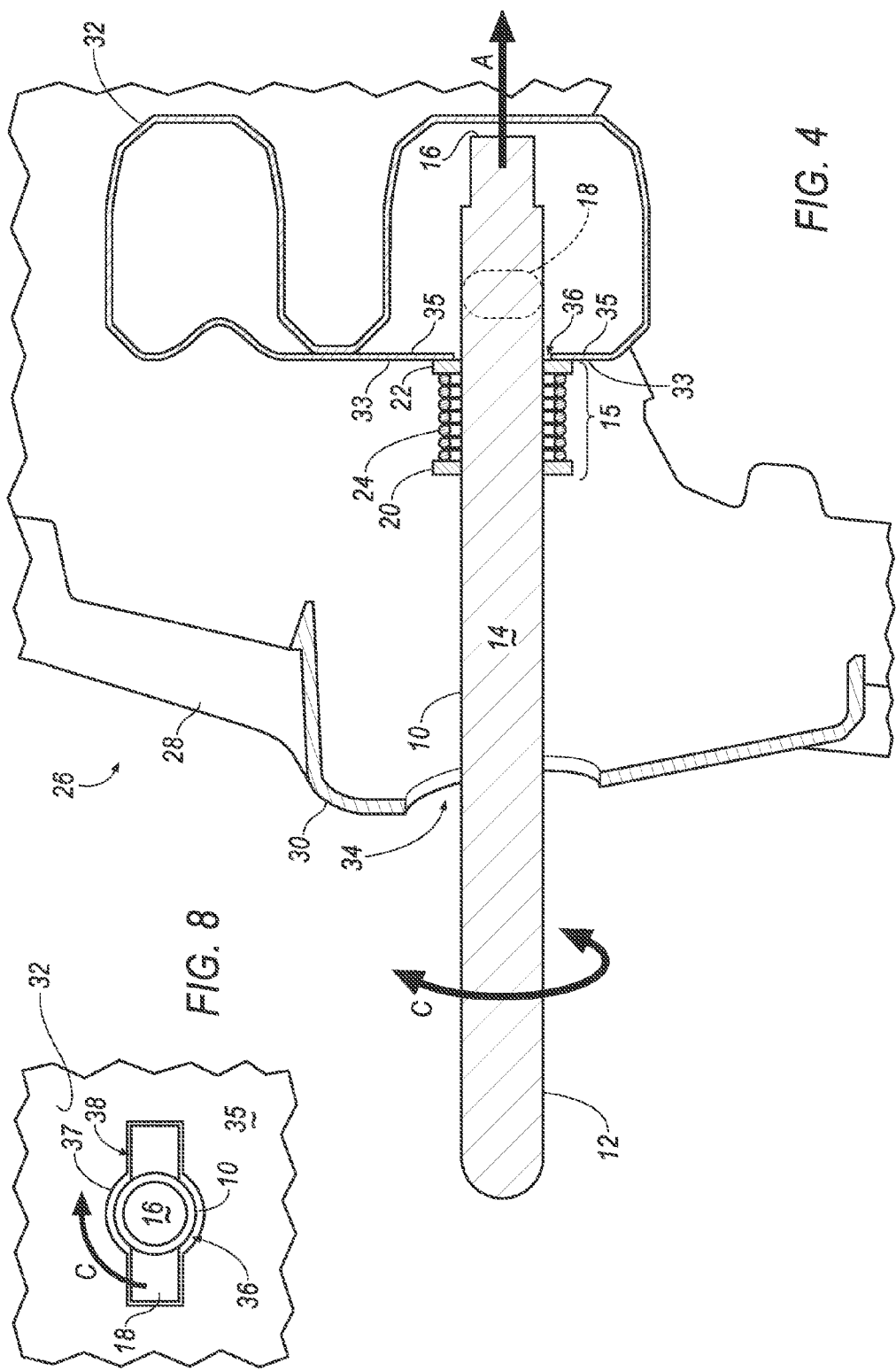

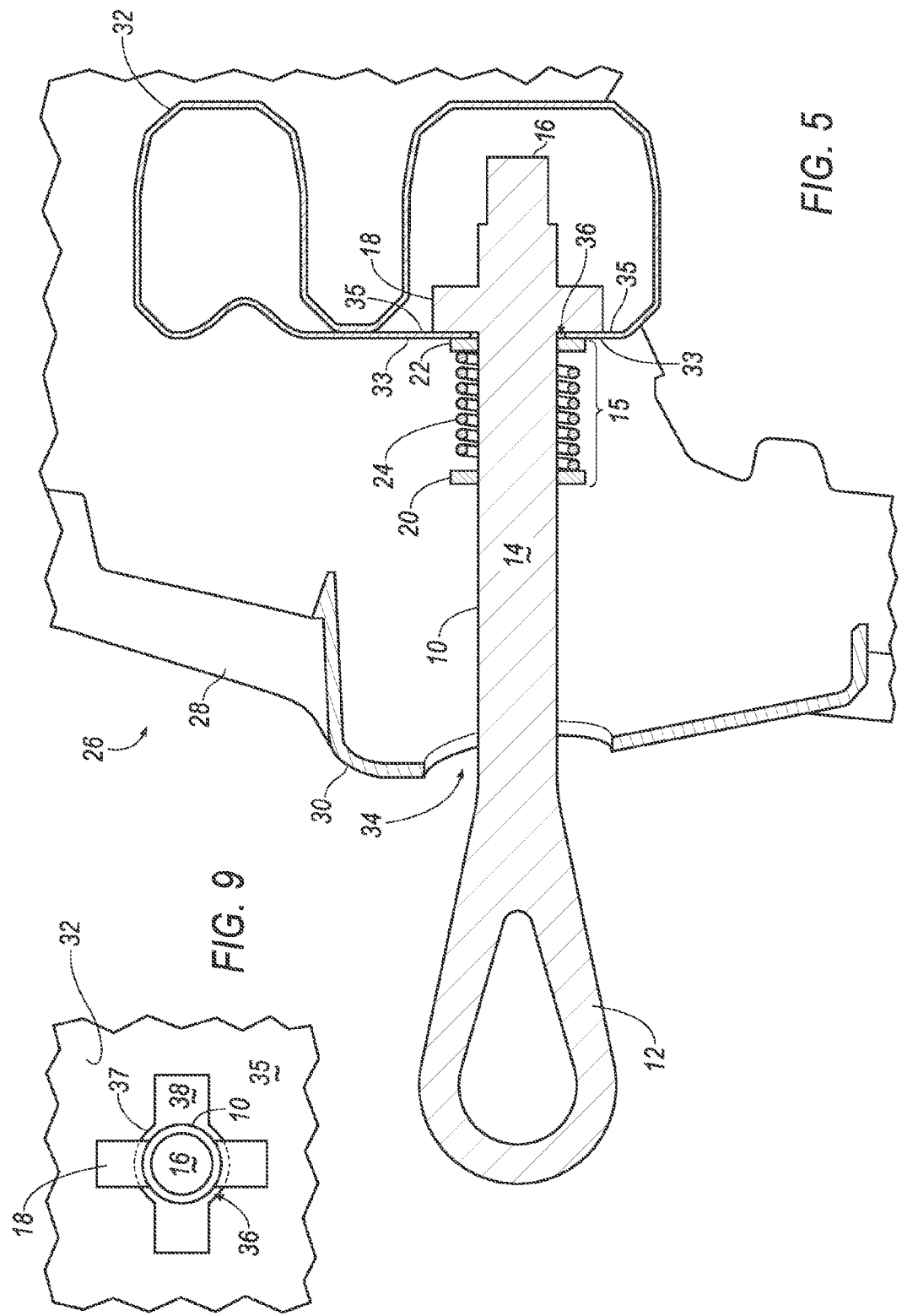

TWIST-LOCK TOW RECOVERY EYE

BACKGROUND

Current mechanisms for towing items with a vehicle include a threaded bolt that attaches through an opening in a front or rear fascia into the vehicle body structure, i.e., a frame or bumper. For example, the threaded bolt may include a screw eye attached to the vehicle, where towing devices, other vehicles, etc., may be attached to the screw eye. Unfortunately, screw eye material gauge, threads per inch and pitch follow inconsistent standards globally. Thus, when vehicles are imported or exported to other countries, replacement parts cannot be readily found. Further, even if an appropriate replacement part can be found, a vehicle's body structure, frame, and/or bumper threaded insert may also become corroded or contain debris such that threads are not engageable or a less than all threads may engage creating resistance that falsely indicates that the thread is fully-seated, thus leading to an unsafe towing scenario.

DRAWINGS

FIG. 2 is a cross-sectional view of the twist-lock tow recovery eye of FIG. 1 prior to insertion into a vehicle.

FIG. 3 is a cross-sectional view of the twist-lock tow recovery eye of FIG. 1 inserted into a vehicle prior to securement to a vehicle frame.

FIG. 4 is a cross-sectional view of the twist-lock tow recovery eye of FIG. 1 inserted into a vehicle and being secured to a vehicle frame.

FIG. 5 is a cross-sectional view the twist-lock tow recovery eye of FIG. 1 after securement to a vehicle frame.

FIG. 6 is a front view of an example opening in a vehicle frame configured to receive the twist-lock tow recovery eye of FIG. 1.

FIG. 7 is a front view of an example opening in a vehicle frame prior to securement of the twist-lock tow recovery eye of FIG. 1 to the frame.

FIG. 8 is a front view of an example opening in a vehicle frame while the twist-lock tow recovery eye of FIG. 1 is being secured to the frame.

FIG. 9 is a front view of an example opening in a vehicle frame after the twist-lock tow recovery eye of FIG. 1 is secured to the frame.

DETAILED DESCRIPTION

Figure 1:
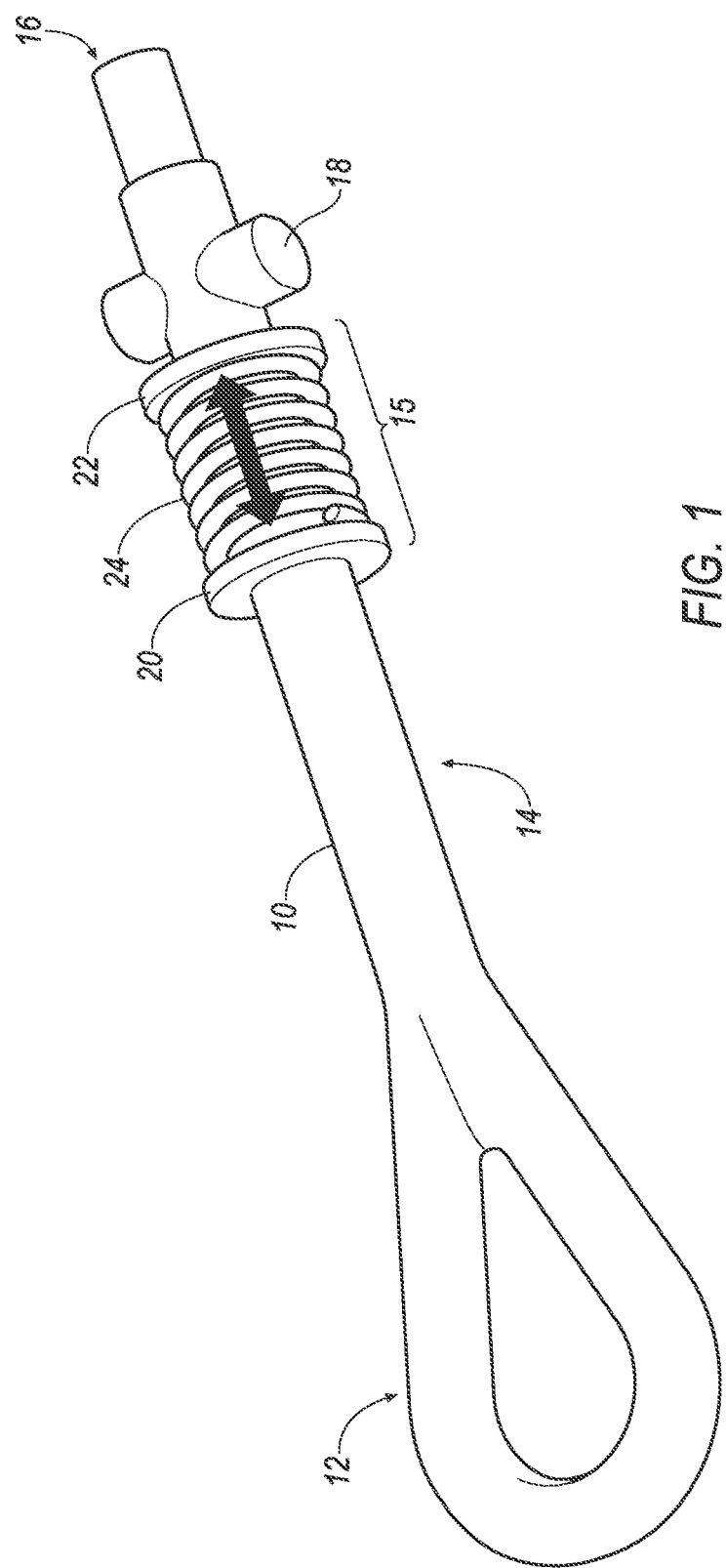
FIG. 1 is a perspective view of an example twist-lock tow recovery eye.

FIG. 1 provides a perspective view of an example threadless twist-lock tow recovery eye 10 that, as explained in the following description and figures, is provided to be secured to a vehicle. Features described herein allow the recovery eye 10 to be safely and securely affixed to a vehicle for towing items, other vehicles, etc. Further, the recovery eye 10 advantageously resolves the above-described problems relating to different material gauges, thread standards, pitch inconsistencies, thread wear, etc.

The tow recovery eye 10 may be formed of a metal, e.g., cast or stamped metal such as steel or a steel alloy, and/or could be hardened in a known manner. As seen in FIG. 1, the recovery eye 10 includes a towing end 12, generally configured as a closed loop or "eye" portion of the recovery eye 10. However, other configurations of the towing end 12, such as a hook, bulb, square end, Y-shaped end, L-shaped end, flat pad end, etc., are possible. A shaft 14 extends from the towing end 12, and terminates at an insertion end 16 that, as described further below, may be inserted in one or more openings in a vehicle.

A resistance assembly 15 is mounted on the shaft 14. The resistance assembly 15 includes a fixed stop such as washer 20 attached to the shaft 14, e.g., by welding or the like. The assembly 15 further includes a movable stop such as a washer 22 mounted on the shaft 14 and capable of moving in a substantially axial direction with respect to the shaft 14 toward and away from the fixed washer 20. With respect to the towing end 12, the washer 20 is proximal, and the washer 22 is distal.

A resistance device 24, e.g., a coil spring or the like, e.g., virtually any compressible substance that deforms and returns to an original shape in a rubber-like manner, that encircles the shaft 14, is disposed between the washers 20, 22. The resistance device 24 biases the washer 22 away from the washer 20; the washer 22 may be moved toward the washer 20 by overcoming resistance provided by the resistance device 24. As shown, the shaft 14 has a generally circular cross-section. This shape may promote mounting of the resistance assembly 15, movement of the washer 22, and other features described herein. However, some or all of the shaft 14 could have other cross-sectional shapes, e.g., square, triangular, hexagonal, ovular, etc.

In addition, located further distally of the assembly 15 with respect to the towing end 12, and proximate to the insertion and 16, is a locking pin 18. For example, the locking pin 18 may have an axis that is substantially perpendicular to an axis of the shaft 14. As described further below the locking pin 18 is used to secure the tow recovery eye 10 to a vehicle.

FIG. 2 is a cross-sectional view of the twist-lock tow recovery eye 10 prior to insertion into a vehicle. Accordingly, the tow recovery eye 10 is shown relative to a rear portion of a vehicle 26 that includes a fascia 28, a bumper 30, and a frame 32. Note that, as used herein, "frame" refers to a vehicle frame and/or body such as are known to receive a tow recovery eye. Further, as is known, a tow recovery eye can be located on either side or both sides of a vehicle, and can be located in the front and/or at the rear, such location generally being dependent on a vehicle manufacturer. Openings 34, 36 are provided in the bumper 30 and frame 32, respectively, to accommodate insertion of the tow recovery eye 10. Each of the openings 34, 36 may be reinforced to prevent wear and damage to the bumper 30 and frame 32, respectively, that may be caused by insertion of the tow recovery eye 10. For example, a conventional welded-on reinforcement could be provided on one or both walls 33, 35 of the frame 32.

The opening 34 is usually substantially circular, although other shapes are possible, and may have a diameter that is larger, e.g., generally by one or more millimeters, than a length of the locking pin 18. Accordingly, the shaft 14, including the locking pin 18 and the resistance assembly 15, which generally has a diameter less than a length of the locking pin 18, may be inserted into the opening 34. Alternatively, the resistance assembly 15 could have a diameter greater than a length of the locking pin 18, whereupon the opening 34 will have a diameter larger than the diameter of the resistance assembly 15.

The opening 36 in the frame 32, in contrast to the opening 34, may have an irregular shape. For example, the opening 36 may include a substantially circular portion 37, as well as a pin slot 38 having substantially straight edges. The circular portion 37 is dimensioned to accommodate a diameter of the shaft 14, e.g., the circular portion 37 may define a diameter slightly larger, e.g., by one or more millimeters, than the diameter of the shaft 14. The pin slot 38 is dimensioned to accommodate the twist-lock pin 18, e.g., a length of the pin slot 38 is generally slightly larger, e.g., by one or more millimeters, than a length of the pin 18. Likewise, a height of the pin slot 38 is generally slightly larger, e.g., by one or more millimeters, than a diameter of the pin 18.

As further seen in FIG. 2, the openings 34, 36 may have centers substantially aligned along an axis A. An axis of the shaft 14 may be substantially aligned with the axis A for insertion of the tow recovery eye 10 into the openings 34, 36.

Turning now to FIG. 3, an illustration is provided of the tow recovery eye 10 inserted into a vehicle 26 rear portion prior to securement to a vehicle frame 32. As seen in FIG. 3, the shaft 14 of the tow recovery eye 10 has been moved along the axis A to insert the tow recovery eye 10 through the openings 34 and 36. The locking pins 18 abut a wall facing the bumper 30 opening 34, e.g., in the presently illustrated example, rear walls 33 of the frame 32, i.e., faces of the frame 32 that face toward the opening 34 of the bumper 30. By turning the tow recovery eye 10 in a rotational direction indicated by the arc B, the locking pins 18 can be inserted through the opening 36 of the frame 32.

This is perhaps best illustrated in FIG. 7, which shows a front view of the arrangement shown in the cross-section in FIG. 3. As seen in FIG. 7, the pins 18 rest against the walls 33 of the frame 32, and the insertion end 16 of the tow recovery eye 10 is aligned with the circular portion 37 of the frame 32 opening 36. By turning the tow recovery eye 10 in a rotational direction as indicated by the arc B, the pins 18 can be aligned with the pin slot 38 so that the tow recovery eye 10 can be inserted through the opening 36.

FIG. 4 illustrates a position of the tow recovery eye 10 after it has been turned in the rotational direction of the arc B shown in FIG. 3 such that the locking pin 18 is aligned with, and pushed through, the pin slot 38 of the frame 32 opening 36. FIG. 8 provides a frontal view of the tow recovery eye 10 with the pin 18 aligned with and pushed through the slot 38 of the opening 36. As can be seen in FIG. 4, the resistance device 24 is in a compressed state, whereas in FIGS. 1-3, the resistance device 24 was shown in an uncompressed state. That is, insertion of the tow recovery eye 10 through the frame 32 results in the washer 22 being pushed against the walls 33, and as the tow recovery eye 10 is further moved along the axis A toward the frame 32, the resistance device 24 is compressed.

As also seen in FIGS. 4 and 8, once the tow recovery eye 10, including the lock pin 18, has been inserted through the opening 36, the tow recovery eye 10 may be moved in a rotational direction shown by the arc C to secure the tow recovery eye 10 with respect to the vehicle 26. FIGS. 5 and 9 show the tow recovery eye 10 in a secured position i.e., after the tow recovery eye 10 has been rotated so that the lock pin 18 is secured against forward walls 35 of the frame 32. As can be seen in FIG. 5, the resistance device 24 has expanded to the uncompressed state. Thus, a tension of the resistance device 24 secures the lock pin 18 against the walls 35, and further holds the tow recovery eye 10 in place even absent a towing load, that is, towable item such as a trailer or other vehicle, being attached to the towing and 12.

As should be clear from the above description, a method of securing the tow recovery eye 10 to a vehicle 26 may begin with aligning an axis of the tow recovery eye 10 with an axis, e.g., the axis A, defined by openings 34, 36 in a bumper 30 and frame 32, respectively. The tow recovery eye 10 may then be inserted in the opening 34. Walls 33 of the frame 32 facing the bumper 30 opening, e.g., facing a rear of the vehicle 26, may stop progress of the tow recovery eye 10 moving along the axis A when the locking pin 18 contacts the walls 33. Rotation of the tow recovery eye 10 and compression of the compression device 24, may allow for the locking pin 18 to be aligned with a slot 38 in the opening 36 such that the pin 18 may be inserted through the opening 36. The tow recovery eye 10 may then be further rotated so that the locking pin 18 is pressed against frame/body walls facing away from the bumper 30, e.g., the forward (i.e., with respect to the vehicle 26) walls 35 of the frame 32. Decompression of the compression device 24 then provides tension to hold the tow recovery eye 10 in place even in the absence of a tow load.

As used herein, the adverb "substantially" means that a shape, structure, measurement, etc. may deviate from an exact described geometry, distance, measurement, etc., because of imperfections in materials, machining, manufacturing, etc.

In the drawings, the same reference numbers indicate the same elements. Further, some or all of these elements could be changed. Accordingly, it is to be understood that the above description is intended to be illustrative and not restrictive.

Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their ordinary meaning as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A vehicle tow recovery eye, comprising:
    a threadless shaft extending along a longitudinal axis from a towing end connectable to a towable item to a locking pin that is insertable in a vehicle opening, the shaft having a substantially circular cross-section and a diameter that is substantially constant along the longitudinal axis; and
    a resistance assembly mounted on the shaft;
    wherein the locking pin has an axis that is substantially perpendicular to the longitudinal axis of the shaft.

2. The tow recovery eye of claim 1, wherein the resistance assembly includes a coil spring.

3. The tow recovery eye of claim 2, wherein the resistance assembly further includes a fixed stop and a moveable stop mounted to the shaft.

4. The tow recovery eye of claim 3, wherein the coil spring is disposed between the fixed stop and the moveable stop, the fixed stop being closer to the towing end than the moveable stop.

5. The tow recovery eye of claim 4, wherein the fixed stop and the moveable stop are each a washer.

6. The tow recovery eye of claim 1, wherein the towing end includes a loop that is connectable to a towable item.

7. A vehicle towing system, comprising:
a vehicle tow recovery eye that includes:
a threadless shaft extending along a longitudinal axis from a towing end connectable to a towable item to a locking pin that is insertable in a vehicle opening, the shaft having a substantially circular cross-section and a diameter that is substantially constant along the longitudinal axis;
a resistance assembly mounted on the shaft,
wherein the locking pin has an axis that is substantially perpendicular to the longitudinal axis of the shaft; and
a portion of a vehicle frame that includes a frame opening dimensioned to accommodate insertion of the shaft and the locking pin.

8. The towing system of claim 7, wherein the frame opening includes a circular portion dimensioned to accommodate the shaft, and a slot dimensioned to accommodate the locking pin.

9. The towing system of claim 7, further including a vehicle bumper having a bumper opening that is dimensioned to accommodate insertion of the tow recovery eye.

10. The towing system of claim 9, further comprising a vehicle that includes the portion of the vehicle frame and the bumper.

11. The towing system of claim 7, wherein the tow recovery eye is rotatable upon being inserted into the frame opening, and rotation of the tow recovery eye secures the locking pin against a wall of the frame.

12. The towing system of claim 11, wherein the resistance assembly includes a resistance device that is decompressible when the locking pin is secured against the wall of the frame.

13. The towing system of claim 7, wherein the resistance assembly includes a resistance device that is compressible when the locking pin contacts the frame and the tow recovery eye is pushed toward the frame.

14. The towing system of claim 7, wherein the resistance assembly includes a coil spring.

15. The towing system of claim 14, wherein the resistance assembly further includes a fixed stop and a moveable stop mounted to the shaft.

16. The towing system of claim 15, wherein the coil spring is disposed between the fixed stop and the moveable stop, the fixed stop being closer to the towing end than the moveable stop.

17. The towing system of claim 15, wherein the fixed stop and the moveable stop are each a washer.

18. The towing system of claim 7, wherein the towing end includes a loop that is connectable to a towable item.

* * * * *